United States Patent
Krohn et al.

(10) Patent No.: US 6,593,913 B1
(45) Date of Patent: Jul. 15, 2003

(54) METHOD AND SYSTEM FOR SELECTING A DISPLAYED CHARACTER USING AN INPUT DEVICE

(75) Inventors: David A. Krohn, Chicago, IL (US); David W. Nathanielsz, Denver, CO (US)

(73) Assignee: Jellyvision, Inc, Chicago, IL (US)

( * ) Notice: Subject to any disclaimer, the term of this patent is extended or adjusted under 35 U.S.C. 154(b) by 0 days.

(21) Appl. No.: 09/525,724

(22) Filed: Mar. 14, 2000

(51) Int. Cl.$^7$ ................................................ G09G 5/00
(52) U.S. Cl. ........................ 345/168; 345/156; 345/828; 463/37
(58) Field of Search ................................ 345/156, 157, 345/168, 707, 708, 709, 780, 811, 812, 813, 819, 828, 831; 463/31, 37

(56) References Cited

U.S. PATENT DOCUMENTS

| | | | |
|---|---|---|---|
| 4,310,839 A | | 1/1982 | Schwerdt |
| 4,709,387 A | | 11/1987 | Masuda |
| 4,911,565 A | | 3/1990 | Ryan |
| 5,198,802 A | | 3/1993 | Bertram et al. |
| 5,543,818 A | * | 8/1996 | Scott ........................... 345/168 |
| 5,861,823 A | | 1/1999 | Strauch et al. |
| 6,016,142 A | * | 1/2000 | Chang et al. ................ 345/763 |
| 6,267,676 B1 | * | 7/2001 | Nagaoka ....................... 463/43 |
| 6,325,719 B1 | * | 12/2001 | Fukawa et al. ............... 463/37 |

* cited by examiner

*Primary Examiner*—Kent Chang
(74) *Attorney, Agent, or Firm*—Brinks Hofer Gilson & Lione

(57) ABSTRACT

The preferred embodiments described herein provide a method and system for selecting a character with a user input device comprising a plurality of buttons. In one preferred embodiment, a first plurality of characters is displayed on a display device in a pattern corresponding to a pattern of a plurality of buttons of a user input device, and a character from the first plurality of characters is selected in response to actuation of one of the plurality of buttons. In this embodiment, the number of characters displayed on the display device for selection by the user input device is less than or equal to the number of buttons in the plurality of buttons. In this way, any of the characters displayed on the display device for selection by the user input device can be selected by actuation of a single one of the plurality of buttons. Other preferred embodiments include using the above-described character selection method to sequentially enter a series of characters and using a character selection method to enter characters of a predetermined word.

22 Claims, 6 Drawing Sheets

METHOD AND SYSTEM FOR SELECTING A DISPLAYED CHARACTER USING AN INPUT DEVICE

BACKGROUND

Instead of using a conventional computer keyboard, some computer systems and/or interactive devices use a user input device with a small number of buttons for entering characters. For example, many computer game systems use a controller having two sets of four buttons: four cursor movement buttons and four selection buttons. To enter characters with such a controller, a character set is often displayed on the system's display device, and a user presses the cursor movement buttons to move a cursor over a desired character to highlight the character. The user then presses one of the selection buttons to select the character. This method of character entry can be both time consuming and tedious to a user since a large number of button presses is often required to select a desired character.

To reduce the number of button presses required for character selection, U.S. Pat. No. 5,543,818 to Scott provides a character entry method in which the displayed character set is divided into groups (or "quads") of four characters. Instead of moving a cursor from character-to-character, sequential actuation of the cursor movement buttons moves a cursor from quad-to-quad. The four characters in each quad are arranged in the same pattern as the selection buttons, and the user presses the selection button that is spatially correlated with a desired letter to select the letter. U.S. Pat. No. 6,016,142 to Chang et al. describes a similar system for use with a numeric keypad of a keyboard. In Chang et al., three 3×3 matrices of characters are displayed, and the nine characters in each matrix are arranged in the same pattern as the 1–9 keys of the numeric keypad. To select one of the displayed characters, the user presses the arrow keys on the keyboard to select and highlight one of the three matrices and then selects a letter in the highlighted matrix by pressing a key on the keypad that is spatially correlated with the desired letter.

While the methods described in Scott and Chang et al. can reduce the number of button presses required for character entry, multiple button presses are still required to select any character that is outside the currently-highlighted quad or matrix. There is a need, therefore, for a method and system that will further reduce the number of button presses required to select a character.

SUMMARY

The present invention is defined by the following claims, and nothing in this section should be taken as a limitation on those claims.

By way of introduction, the preferred embodiments described below provide a method and system for selecting a character with a user input device comprising a plurality of buttons. In one preferred embodiment, a first plurality of characters is displayed on a display device in a pattern corresponding to a pattern of a plurality of buttons of a user input device, and a character from the first plurality of characters is selected in response to actuation of one of the plurality of buttons. In this embodiment, the number of characters displayed on the display device for selection by the user input device is less than or equal to the number of buttons in the plurality of buttons. In this way, any of the characters displayed on the display device for selection by the user input device can be selected by actuation of a single one of the plurality of buttons.

In another preferred embodiment, the above-described character selection method is used to sequentially enter a series of characters. In this embodiment, a second plurality of characters is selected from a character set at least in part in response to the character selected from the first plurality of characters. The characters in the second plurality of characters are then displayed on the display device in a pattern corresponding to the pattern of the plurality of buttons of the user input device, and a character from the second plurality of characters is selected in response to actuation of one of the plurality of buttons. In yet another preferred embodiment, a character selection method is presented for entering characters of a predetermined word.

The preferred embodiments will now be described with reference to the attached drawings.

DETAILED DESCRIPTION OF THE PRESENTLY PREFERRED EMBODIMENTS

Figure 1:
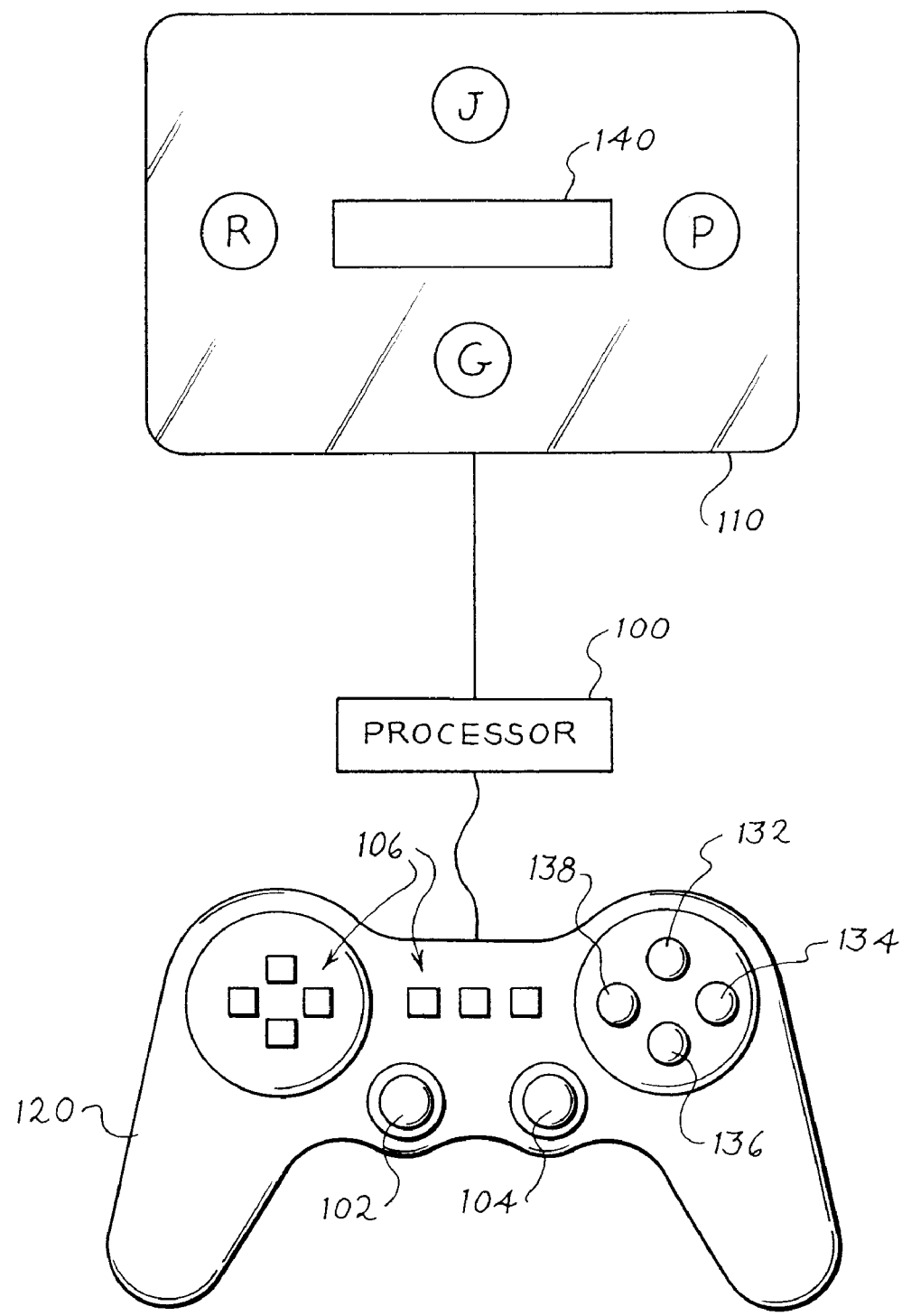
FIG. 1 is a block diagram of a character selection system of a presently preferred embodiment.

Turning now to the drawings, FIG. 1 is a block diagram of a character selection system of a presently preferred embodiment. As shown in FIG. 1, this system comprises a processor 100 coupled with a display device 110 and a user input device 120. As used herein, the term "coupled with" means directly coupled with or indirectly coupled with through one or more components. For simplicity, the term "processor" is meant to broadly refer to the hardware and/or software components that can be used to implement the preferred embodiments described herein. It should be understood that any appropriate hardware (analog or digital) or software can be used and that the preferred embodiments can be implemented exclusively with hardware. Further, if the processor 100 is used in a computer system, the processor 100 can be separate from or combined with (in whole or in part) other processors of the system.

The user input device 120 comprises a plurality of buttons 132, 134, 136, 138 that can be actuated by a user. In the preferred embodiment shown in FIG. 1, the user input device 120 is shaped to be held by both hands of a user, and the buttons 132, 134, 136, 138 are positioned on the user input device 120 so that the buttons can be actuated by a user's thumb or fingers. For simplicity, the term "button" is used herein to broadly refer to any element that can be actuated by a digit of a human user. A button can be, for example, a mechanical element that is actuated by a user depressing the mechanical element. A button can also be a touch-sensitive element that is actuated merely by touch. As described in more detail below, the plurality of buttons 132, 134, 136, 138 can be used to select a character displayed on the display device 110. Although there are four buttons in the plurality of buttons in this preferred embodiment, it is important to note that the plurality of buttons used to select a displayed character can comprise more or fewer than four buttons. In addition to the plurality of buttons 132, 134, 136, 138 used to select a displayed character, the user input device 120 can also comprise additional user interface elements such as joysticks 102, 104 and additional buttons 106. It is preferred that the display device 110 and the user input device 120 (and the buttons thereon) be separate devices.

In one preferred embodiment, the processor 100 is part of a game console platform (such as a game system marketed by Sony, Nintendo, or Sega), and the user input device 120 is a game controller for the system. In another preferred embodiment, the processor 100 is part of an interactive cable television (ICTV) set-top box, and the user input device 120 is a hand controller of the ICTV set-top box or a remote control of a television. In other preferred embodiments, the processor 100 is part of a multimedia player or a general purpose computer. In some applications, the processor is in a location remote from the display device, and the user input device sends signals to the remote processor via an intermediate component, such as a set-top box. The remote processor returns signals to the intermediate component for display on the display device. Further, in certain applications, the user input device takes the form of a conventional computer keyboard. Of course, many other forms of a "processor" and a "user input device" are possible, and these examples should not limit the scope of the invention in any way.

As mentioned above, the system of FIG. 1 can be used in a method for selecting a character displayed on the display device 110 using the user input device 120. As used herein, the term "character" is meant to broadly refer to any image that is presented on the display device 110 for selection by the user input device 120. Examples of "characters" include, but are not limited to, alphanumeric characters (in English and/or non-English languages), punctuation, symbols (e.g., mathematical symbols), pictographic representations, and other images. A "character" can also include a blank space.

Figure 2:
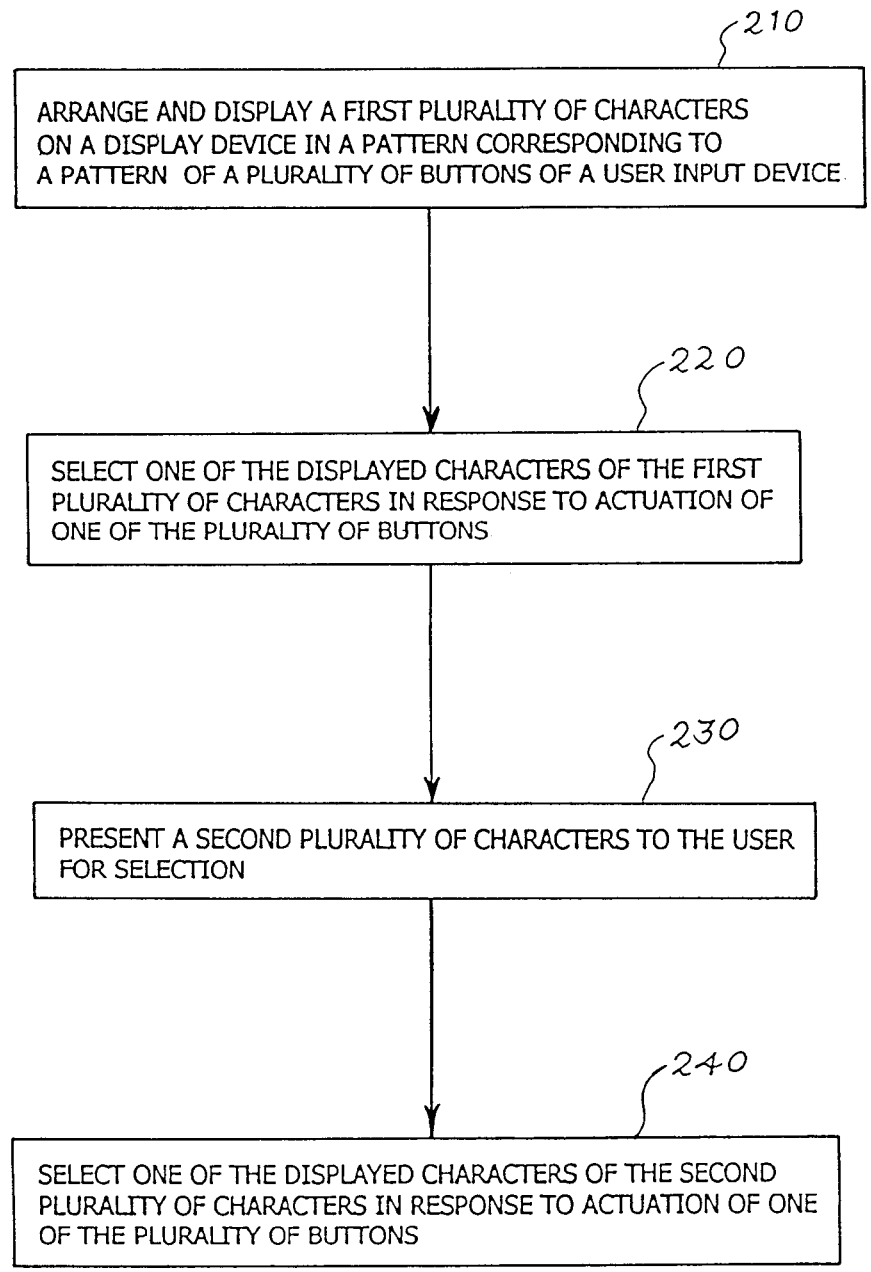
FIG. 2 is flow chart of a character selection method of a presently preferred embodiment.

A preferred method for selecting a character displayed on the display device 110 is illustrated in the flow chart of FIG. 2. As shown in the flow chart, the processor 100 arranges and displays a first plurality of characters on the display device 110 in a pattern corresponding to a pattern of the plurality of buttons 132, 134, 136, 138 of the user input device 120 (act 210). With reference to FIG. 1, the display device 110 presents an on-screen image of four characters (J, P, G, and R) arranged in a diamond pattern that corresponds to the diamond pattern of the four buttons 132, 134, 136, 138 on the user input device 120. Next, the processor 100 selects one of the displayed characters of the first plurality of characters in response to actuation of one of the plurality of buttons 132, 134, 136, 138 (act 220). With reference again to FIG. 1, the processor 100 is operative to select the topmost character (J) in response to actuation of button 132, the rightmost character (P) in response to actuation of button 134, the bottommost character (G) in response to actuation of button 136, and the leftmost character (R) in response to actuation of button 138. The selected character can optionally be displayed in a character entry field 140 on the display device 110.

Because the number of characters displayed on the display device 110 for selection by the user input device 120 is less than or equal to the number of buttons used to select a desired character, any of the characters displayed on the display device 110 for selection by the user input device 120 can be selected by actuation of a single one of the buttons 132, 134, 136, 138. That is, the characters of the first plurality of characters are the only displayed characters selectable by the user input device. (Of course, other characters not selectable by the user input device can be displayed along with the first plurality of characters.) Accordingly, unlike prior art selection techniques, this technique allows selection of any of the displayed character choices with a single button press, thereby providing an elegant and easy-to-use alternative to the otherwise tedious and time-consuming task of character selection.

The above-described method can be repeated for several characters to allow the user to enter a series of characters, or a word. As used herein, the term "word" means any series of characters, which may or may not spell a pronounceable text. To perform sequential character entry, the processor 100 presents a second plurality of characters to the user for selection after the character from the first plurality of characters has been selected (act 230). The characters in the second plurality of characters, which can be the same as or different from the characters in the first plurality of characters, are also arranged in a pattern corresponding to the pattern of the plurality of buttons 132, 134, 136, 138 of the user input device 120. As with the first plurality of characters, the processor 100 selects one of the displayed characters of the second plurality of characters in response to actuation of one of the plurality of buttons 132, 134, 136, 138 (act 240).

The characters that make up the second plurality of characters can be chosen from a larger character set at least in part by the character selected from the first plurality of characters. For example, the processor 100 can use a character prediction method to select the four characters from the character set that are the most likely to be selected or follow the first selected character. By way of illustration, if the first selected character is Q, the processor 100 can determine that U is one of the four most-likely characters to be chosen after Q and can present U as one of the characters in the second plurality of characters for selection by the user.

As another example, the character selection method is used to allow a user to enter one or more predetermined words (words that are known to the processor 100). In this application, if the first selected character is from a predetermined word, one of the characters of the second plurality of characters is the character that follows the first selected character in the predetermined word (i.e., the next character in the predetermined word). For example, if the predetermined word is HELLO and the user has selected H, E will be one of the characters in the second plurality of characters presented to the user for selection. One application for this technique is a computer game in which a user enters an answer in response to a question. The answer entered by the user can be a predetermined correct answer, a predetermined incorrect/wrong answer, or a random answer. In the following illustration, the correct answer is "Cadillac," and the incorrect answers are "Camry," "Corolla," "Ford," and "Mercury."

Figure 3A:
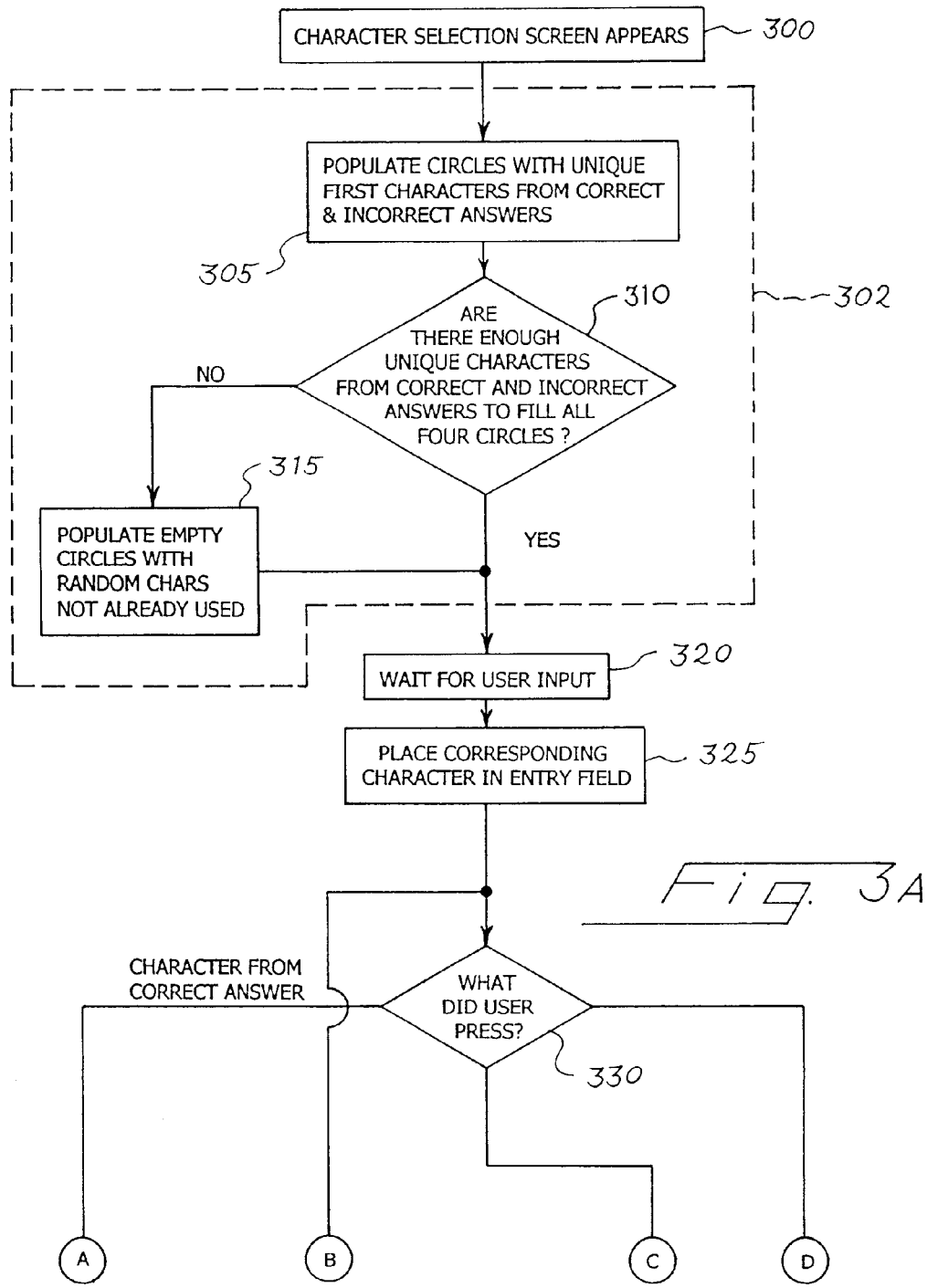
FIGS. 3A, 3B, and 3C present a flow chart of a method of a presently preferred embodiment for entering a character of a predetermined word.
Figure 3B:
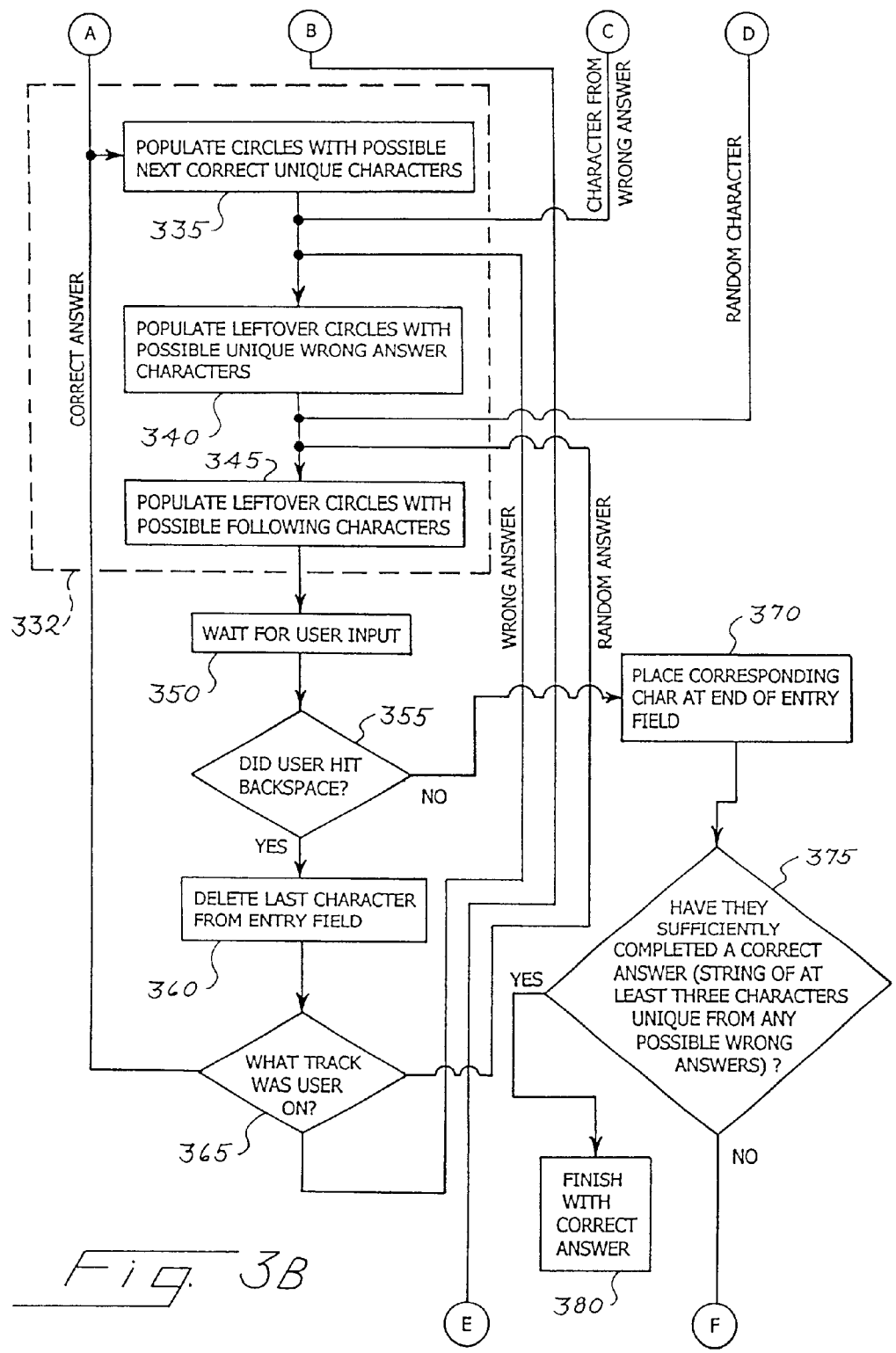
Figure 3C:
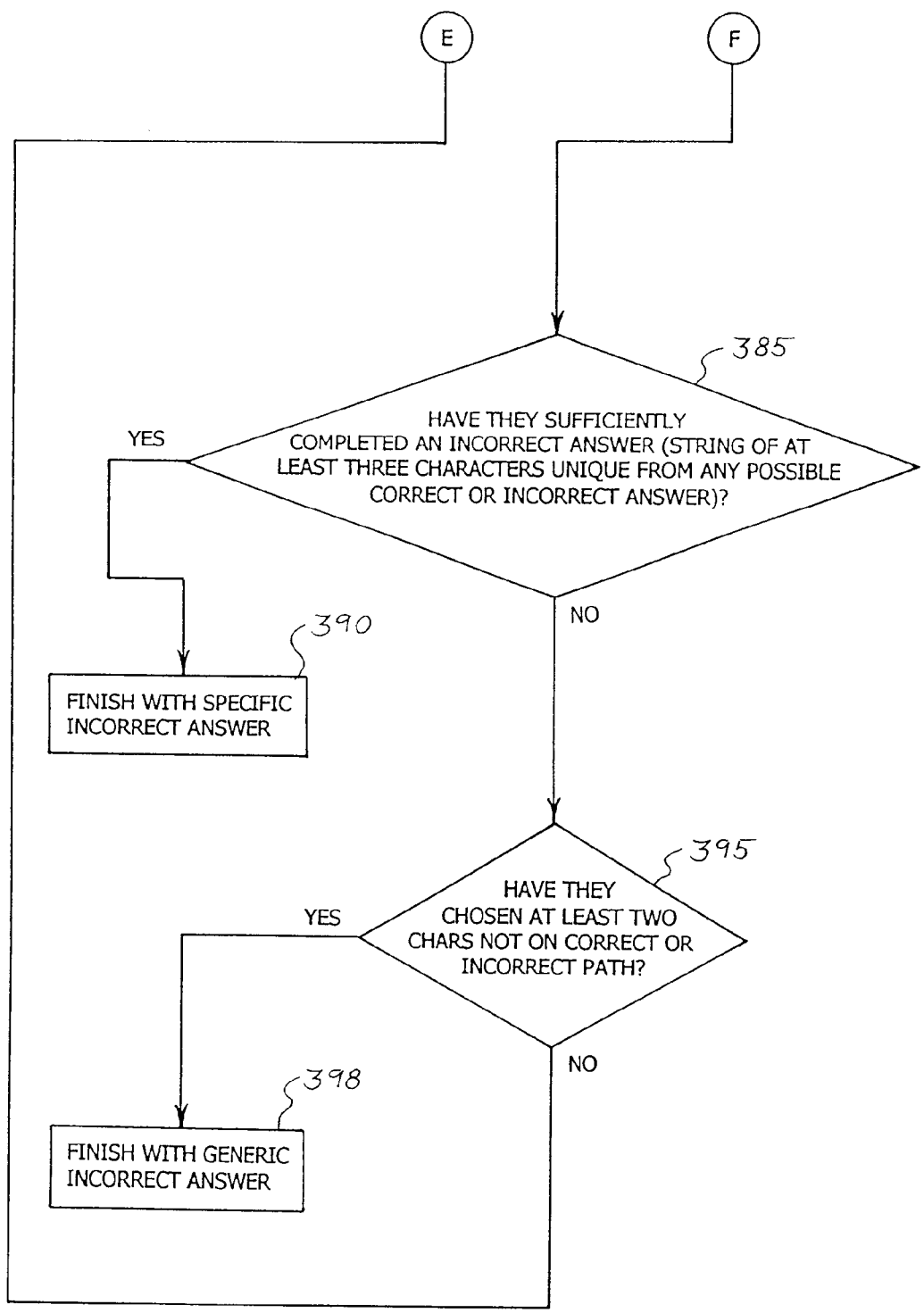
Figure 4:
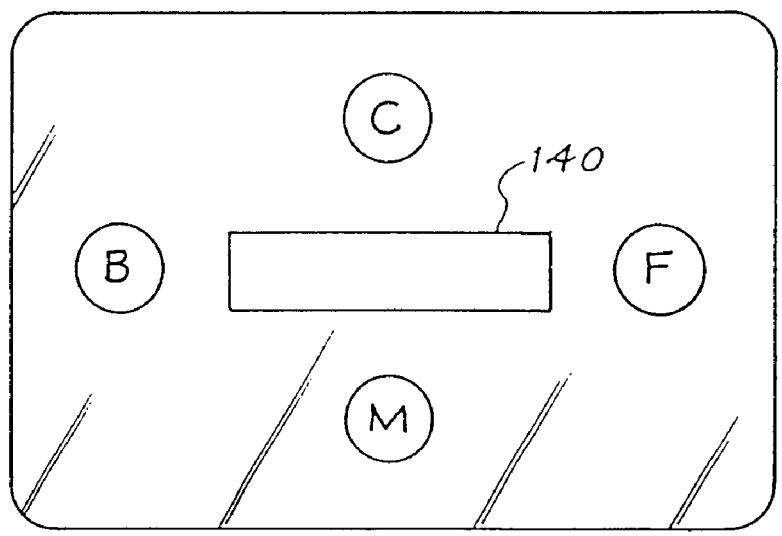
FIG. 4 is an illustration of four displayed characters on a display device of a preferred embodiment.

Turning now to the flow chart of FIG. 3, when the user wishes to enter characters (e.g., to "ring-in" to answer a question), the user presses one of the plurality of buttons 132, 134, 136, 138 or another button on the user input device 120 to display a character-selection screen (act 300). Alternatively, the character-selection screen can be displayed automatically or in response to some other user input. Next, the processor 100 selects a first plurality of characters from a larger character set and displays the first plurality to the user for selection (act 302). In this example, the selection and display process is referred to as "populating circles," where "circles" refers to the locations where the characters selectable by the user input device 120 are displayed. The circles (and the characters displayed therein) are arranged in a pattern that corresponds to the pattern of the plurality of buttons 132, 134, 136, 138 of the user input device 120. The first act in the population process is to populate the circles with unique first characters of the correct and incorrect answers (act 305). In this example, the first character of the correct answer is C, and the first characters of the incorrect answers are C, F, and M. Accordingly, the processor 100 populates three of the four circles with C, F, and M. The processor 100 then determines whether there are enough unique characters from the correct and incorrect answers to fill each of the four circles (act 310). If there are not enough characters, the processor 100 populates the empty circles with random characters that are not already used (act 315). In this example, the processor 100 can populate the one empty circle with the letter B. After all the circles have been populated (as shown in FIG. 4), the processor 100 waits for user input (act 320).

Figure 5:
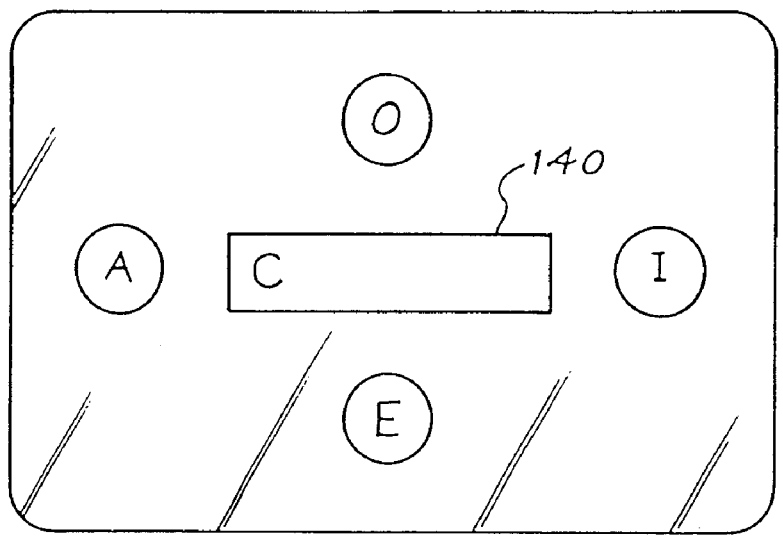
FIG. 5 is another illustration of four displayed characters on a display device of a preferred embodiment.

As described above, the user selects a desired character by actuating the one button of the plurality of buttons 132, 134, 136, 138 that is spatially correlated with the displayed desired character. For example, to select the letter C, the user actuates the topmost button 132, and the selected character (C) is placed in the entry field 140 (act 325). The processor 100 then determines whether the selected character is a character from the correct answer, a character from the incorrect answer, or a random character (act 330). The processor 100 then selects and displays a second plurality of characters to the user for selection (i.e., populates the circles with a second plurality of characters) (act 332). If the selected character is from the correct answer (i.e., if the selected character is C), one of the characters of the second plurality of characters is the next correct unique character (A) (act 335). The processor 100 also selects the next unique character in the incorrect answer (O) (act 340). The remaining two characters are selected using the rule set shown in Table 1 (act 345). In this example, the remaining two characters are E and I (see FIG. 5).

If the selected character is from the incorrect answer, the processor 100 selects the next unique character in the incorrect answer (act 340) and the remaining characters according to the rule set shown Table 1 (act 340). If the selected character is a random character, the processor 100 populates all of the circles according to the rule set shown in Table 1 (act 340).

TABLE 1

| Character | Possible Following Characters |
| --- | --- |
| A | BCDFGILMNPRSTUWXY |
| B | AEHILORSUY |
| C | ACEHIKLORTUY |
| D | ADEGIORSUY |
| E | ABDFGILMNPRSTWXY |
| F | AEFILORTUY |
| G | AEGHILNORSUY |
| H | AEIORSTUY |
| I | ABCDEFGLMNPRSTV |
| J | AEHIORUY |
| K | AEHILNORSUY |
| L | ABCDEFGIKLMNOPSTUY |
| M | ABEIMOPSUY |
| N | ACDEGIKNOSTUVY |
| O | BCDFGILMNOPRSTUW |
| P | AEHILOPRSTUY |
| Q | ARUW |
| R | ABCDEFGIKLMNOPRSTUVY |
| S | ACEHIKLMNOPTUWY |
| T | AEHIORSTUWY |

TABLE 1-continued

| Character | Possible Following Characters |
| --- | --- |
| U | ADEGILMNPRST |
| V | AEILORSUY |
| W | ADEFIKLNOPRSTU |
| X | ACEIMNOPRTUY |
| Y | AEIMNOPRSU |
| Z | AEHIORSTUY |

After the second plurality of characters has been selected and the circles populated, the processor 100 waits for user input (act 350). As above, the user selects a desired character by actuating one of the plurality of buttons 132, 134, 136, 138 that is spatially correlated with the desired displayed character. If, instead of actuating one of the plurality of buttons 132, 134, 136, 138 to select a character, the user actuates a "backspace" button (act 355), the processor 100 deletes the last character from the entry field 140 (act 360) and re-presents characters for user selection based on whether the user was on a correct-answer track or a wrong-answer track (act 365).

If the user selects a displayed character, the selected character is placed at the end of the entry field 140 (act 370). In some applications, it may be desired to further reduce the number of button actuations needed to enter a word by determining, based on the characters that have been previously selected, whether the user is attempting to enter one of the predetermined words. If the user is making such an attempt, the processor 100 can complete the entry of the remaining characters automatically, thereby saving the user from manually completing the entry with additional button actuations. In this illustration, the processor 100 determines whether the user has selected enough characters to indicate that a correct answer is being entered (act 375). For example, the processor 100 can determine whether a string of at least three characters unique from any possible wrong answer has been entered. If the user has selected enough characters, the processor 100 displays the remaining characters of the correct answer in the entry field 140 (act 380). If not, the processor 100 determines whether the user has sufficiently completed an incorrect answer (act 385). For example, the processor 100 can determine whether a string of at least three characters unique from any possible correct or incorrect answer has been entered. If the user has sufficiently completed an incorrect answer, the processor 100 displays the remaining characters of the incorrect answer in the entry field 140 (act 390). If not, the processor 100 determines whether the user has chosen at least two characters not in the correct or incorrect answers (act 395). If so, the processor 100 displays a generic incorrect answer in the entry field 140 (act 398); otherwise, the processor 100 continues the character selection process by returning to act 330. By conducting these determinations, the processor 100 reduce the number of button actuations needed to enter a word.

It is intended that the foregoing detailed description be understood as an illustration of selected forms that the invention can take and not as a definition of the invention. It is only the following claims, including all equivalents, that are intended to define the scope of this invention.

What is claimed is:

1. A method for selecting a character with a user input device comprising a plurality of buttons, the method comprising:

(a) displaying a first plurality of characters on a display device, the displayed first plurality of characters being arranged in a pattern corresponding to a pattern of a plurality of buttons of a user input device; and (b) selecting a character from the first plurality of characters in response to actuation of one of the plurality of buttons of the user input device;

wherein a number of characters displayed on the display device for selection by the user input device is less than or equal to a number of buttons in the plurality of buttons, whereby any of the characters displayed on the display device for selection by the user input device can be selected by actuation of a single one of the plurality of buttons.

2. The invention of claim 1 further comprising:

(c) after the character is selected in (b), displaying a second plurality of characters on the display device, the displayed second plurality of characters being arranged in a pattern corresponding to the pattern of the plurality of buttons of the user input device; and (d) selecting a character from the second plurality of characters in response to actuation of one of the plurality of buttons of the user input device.

3. The invention of claim 2, wherein at least one character in the second plurality of characters is determined at least in part by the character selected in (b).

4. The invention of claim 2, wherein the second plurality of characters is a subset of a larger character set, and wherein at least one character in the second plurality of characters is chosen from the larger character set by predicting which character is likely to be selected after the character selected in (b).

5. The invention of claim 2, wherein the character selected in (b) is a character in a predetermined word, and wherein a character in the second plurality of characters is a character that follows the character selected in (b) in the predetermined word.

6. The invention of claim 1, wherein the first plurality of characters is displayed in response to actuation of one of the plurality of buttons.

7. The invention of claim 1, wherein the user input device comprises an additional button, and wherein the first plurality of characters is displayed in response to actuation of the additional button.

8. The invention of claim 1, wherein the display device and the user input device are separate devices.

9. The invention of claim 1, wherein the user input device comprises a controller of a game system.

10. The invention of claim 1, wherein the user input device comprises a controller of an interactive television set-top box.

11. The invention of claim 1, wherein the user input device comprises a controller of a multimedia player.

12. A system for selecting a character with a user input device comprising a plurality of buttons, the system comprising:

a display device;

a user input device comprising a plurality of buttons arranged in a pattern; and a processor coupled with the display device and the user input device, the processor being operative to display a first plurality of characters on the display device in a pattern corresponding to the pattern of the plurality of buttons and being further operative to select a character from the first plurality of characters in response to actuation of one of the plurality of buttons;

wherein a number of characters displayed on the display device for selection by the user input device is less than or equal to a number of buttons in the plurality of buttons, whereby any of the characters displayed on the display device for selection by the user input device can be selected by actuation of a single one of the plurality of buttons.

13. The invention of claim 12, wherein the processor is further operative to display a second plurality of characters on the display device in a pattern corresponding to the pattern of the plurality of buttons of the user input device.

14. The invention of claim 13, wherein at least one character in the second plurality of characters is determined at least in part by the selected character.

15. The invention of claim 13, wherein the second plurality of characters is a subset of a larger character set, and wherein at least one character in the second plurality of characters is chosen from the larger character set by predicting which character is likely to be selected.

16. The invention of claim 13, wherein the selected character is a character in a predetermined word, and wherein a character in the second plurality of characters is a character that follows the selected character in the predetermined word.

17. The invention of claim 12, wherein the processor is further operative to display the first plurality of characters in response to actuation of one of the plurality of buttons.

18. The invention of claim 12, wherein the user input device comprises an additional button, and wherein the processor is further operative to display the first plurality of characters in response to actuation of the additional button.

19. The invention of claim 12, wherein the display device and the user input device are separate devices.

20. The invention of claim 12, wherein the user input device comprises a controller of a game system.

21. The invention of claim 12, wherein the user input device comprises a controller of an interactive television set-top box.

22. The invention of claim 12, wherein the user input device comprises a controller of a multimedia player.

* * * * *